Patented Mar. 31, 1942

2,277,736

UNITED STATES PATENT OFFICE 2,277,736

DIELECTRIC MATERIAL AND METHOD OF MAKING THE SAME

Eugene Wainer and Norman R. Thielke, Niagara Falls, N. Y., assignors to The Titanium Alloy Manufacturing Company, New York, N. Y., a corporation of Maine No Drawing. Original application July 4, 1939, Serial No. 282,810. Divided and this application February 3, 1941, Serial No. 377,207

2 Claims. (Cl. 106—46)

This invention relates to ceramic dielectric materials and the method of making the same. More particularly it relates to such materials in which titanium dioxide is the predominant constituent.

This application is a division of our copending application Serial No. 282,810, filed July 4, 1939. In our prior application Serial No. 270,462, filed April 27, 1939, a method of forming and firing such dielectric material was pointed out in detail. In addition, the disadvantages of certain impurities in titanium dioxide when intended to be used as a dielectric were also pointed out. Finally, it was pointed out that there were certain advantages in adding the titanates of the alkaline earth metals, calcium, barium and strontium.

It is an object of this invention to produce a titanium dioxide ceramic of improved characteristics. It is a further object to provide a method for forming ceramic bodies of excellent dielectric characteristics. Other objects will appear hereinafter.

These objects are accomplished by incorporating in a ceramic dielectric body, containing principally titanium dioxide, a minor quantity of boron titanate. In general, the quantity of such titanate is preferably between 3% and 20% of the entire ceramic composition. Amounts below 3% are relatively ineffectual and amounts above 20% have the following disadvantages: production of higher shrinkages; difficulty of maintaining proper purity and uniformity, due to the fluxing action of the titanate; difficulty of preventing warpage; development of gas porosity due to bubbling, and sometimes an adverse effect on the dielectric constant. The particle fineness of the titanate should be comparable to that of the titanium dioxide base.

The particle size of the titanium dioxide base is also of importance in securing the best results. Materials containing particles of a lower maximum size (i. e. finer particles) are more suitable for several reasons: they are much easier to control on firing; the values obtained are more uniform; the temperature range of satisfactory vitrification is broadened; there is less tendency towards crystallization; there is less porosity; and the effect of impurities is minimized. Best results are also secured by firing the ceramic dielectric to a temperature such as to secure maximum vitreous structure with substantially no crystalline growth.

Although it is possible to form boron titanate at firing temperatures by adding boron oxide to titanium dioxide, it is not desired to do so because of the considerable shrinkage encountered in the formation of this compound.

The invention having been described, the following example is now given:

Example

Pigment grade $TiO_2$ of suitable purity is heated, without other preparation, to a temperature of 1350° C., and maintained there for several hours. The resulting material shows well-defined crystals of an average particle size of about 2 microns. This material shows the following analysis:

| | |
|---|---|
| $TiO_2$ | 97.8 |
| $SiO_2$ | 1.56 |
| $ZrSiO_4$ | ----- |
| $Fe_2O_3$ | 0.038 |
| $Al_2O_3$ | 0.40 |
| $CaO$ | 0.03 |
| $MgO$ | 0.04 |
| $MnO_2$ | 0.004 |
| $P_2O_5$ | 0.06 |
| $Cr_2O_3$ | ----- |
| $Na_2O$ | ----- |
| $BaO$ | ----- |
| $CuO$ | 0.001 |
| $B_2O_3$ | 0.001 |
| $V_2O_5$ | 0.001 |

900 grams of $TiO_2$ are prepared above and 100 grams of boron titanate ($B_2TiO_5$) are thoroughly mixed by ball milling with water, dried and disintegrated. To this mixture 10% by weight of 5% gelatin solution is added and thoroughly incorporated and the batch passed through a 20 mesh screen. 125 grams of the batch is placed in the cavity of a steel mold 4 inches in diameter and the specimen formed under a pressure of 1200 pounds per square inch. The body is then fired according to the following schedule: it is brought to the peak temperature (2300° F.) at the rate of 50° F. per hour. It is held six hours at the peak temperature, the temperature then decreased at the rate of 50° F. per hour to 1200° F., then at the rate of 100° F. per hour from 1200° F. to 800° F., and the furnace then shut down. A close textured body about 0.5 cm. thick and 8.76 cms. in diameter is produced.

Electrical measurements were made on this body at 20°–25° C. and 50%–60% relative humidity. Resistivity was measured at intervals of one, two and three minutes after the current was applied, and was 12,400,000 megohm-centimeters after 1 minute, 19,900,000 megohm-centimeters after 2 minutes, and 28,400,000 megohm-centimeters after 3 minutes. A current of 90 volts was used. The dielectric constant (K) was 74.0 and the power factor 0.11% at a frequency of 1,000,000 cycles per second with approximately 35% modulation at 20 volts input. The above figures are the weighted average for a number of test pieces. The dielectric strength was not measured, but in all cases was excellent and well within the commercially practical range. The change in power factor and dielectric constant with increase in temperature is shown in the table below. Measurements in this case were made only on the best sample test piece. Although the measurements were made up to 150° C., temperatures above 75° C. are not usually encountered in practice, especially in radio and television work. Therefore the figures above 75° C. are relatively unimportant.

Table

| Temperature | Power factor (percent) | Dielectric constant |
|---|---|---|
| 25° C | 0.03 | 78.2 |
| 40° C | 0.09 | 76.3 |
| 50° C | 0.09 | 75.6 |
| 75° C | 0.09 | 72.7 |
| 100° C | 0.09 | 71.1 |
| 110° C | 0.10 | 70.2 |
| 125° C | 0.10 | 69.1 |
| 135° C | 0.10 | 68.4 |
| 150° C | 0.11 | 67.4 |

It will be seen from the above figures and table that the electrical characteristics of the ceramic materials in accordance with this invention are excellent. An extremely valuable property, in addition, is the enormous strength developed on firing. This property is of prime importance in the fabrication of insulators to be used as ground foundations for cross country high tension installations where the insulator must have great strength to resist the weight of the steel column, must have high resistivity, high capacitance and good temperature perquisites. In all respects the $TiO_2$—$B_2TiO_5$ body fulfills the necessary qualifications.

As many variations are possible within the scope of this invention, it is not intended to be limited except as defined by the appended claims.

We claim:

1. The method of forming a ceramic dielectric material comprising firing at an elevated temperature a composition containing 80 to 97% of titanium dioxide and 3 to 20% of boron titanate.

2. The method of forming a ceramic dielectric material comprising firing, at an elevated temperature such as to obtain maximum vitreous structure with substantially no crystalline growth, a composition containing 80 to 97% of titanium dioxide and 3 to 20% of boron titanate.

EUGENE WAINER.
NORMAN R. THIELKE.